US008018569B2

(12) United States Patent  
Goodhill et al.

(10) Patent No.: US 8,018,569 B2  
(45) Date of Patent: Sep. 13, 2011

(54) METHOD AND APPARATUS FOR INHIBITING THE PIRACY OF MOTION PICTURES

(75) Inventors: Dean K. Goodhill, Los Angeles, CA (US); Ty Safreno, San Luis Obispo, CA (US)

(73) Assignee: MaxiVision Cinema Technology, Los Angeles, CA (US)

( * ) Notice: Subject to any disclaimer, the term of this patent is extended or adjusted under 35 U.S.C. 154(b) by 465 days.

(21) Appl. No.: 11/916,778

(22) PCT Filed: Jun. 8, 2006

(86) PCT No.: PCT/US2006/022364  
§ 371 (c)(1),  
(2), (4) Date: Jun. 24, 2008

(87) PCT Pub. No.: WO2006/133376  
PCT Pub. Date: Dec. 14, 2006

(65) Prior Publication Data  
US 2008/0309883 A1    Dec. 18, 2008

Related U.S. Application Data

(60) Provisional application No. 60/688,466, filed on Jun. 8, 2005.

(51) Int. Cl.  
*H04N 7/167* (2006.01)  
*H04K 1/02* (2006.01)  
*G03B 21/43* (2006.01)
(52) U.S. Cl. .......................... 352/40; 352/41
(58) Field of Classification Search ............ 352/38, 352/40, 41, 204–220  
See application file for complete search history.

(56) References Cited

U.S. PATENT DOCUMENTS

| 3,958,077 | A |   | 5/1976  | Ross et al. |
| 5,096,286 | A | * | 3/1992  | Weisgerber ............... 352/40 |
| 5,680,454 | A | * | 10/1997 | Mead ........................ 380/204 |
| 6,019,473 | A | * | 2/2000  | Goodhill et al. ............ 352/180 |

(Continued)

FOREIGN PATENT DOCUMENTS

EP    1487201    12/2004

(Continued)

OTHER PUBLICATIONS

European Search Report for International Application No. PCT/US2006/022364, dated Oct. 19, 2009, in 7 pages.

(Continued)

*Primary Examiner* — William C Dowling  
(74) *Attorney, Agent, or Firm* — Knobbe, Martens, Olson & Bear, LLP

(57) ABSTRACT

A method and apparatus to inhibit the piracy of motion pictures in theaters by taking advantage of the frame rate discrepancies between film (or digital) display and video camcorders. By alternating specific image display intervals and, shuttering cadences, or with digital video projectors commanding a similar modified display via the digital projector's blanking and display capabilities, so that the projected images occur in a random and/or phase shifted manner, objectionable distortions are produced in an illicitly captured video image, while being invisible to theatrical viewers. In addition, various serrated, slit, multi-quadrant or spotted patterns may be used on mechanical shutters, or simulated on digital displays, to further degrade the quality of illicitly captured video by pirates in theaters.

44 Claims, 5 Drawing Sheets

U.S. PATENT DOCUMENTS

| | | | |
|---|---|---|---|
| 6,529,600 B1 * | 3/2003 | Epstein et al. | 380/252 |
| 6,950,532 B1 * | 9/2005 | Schumann et al. | 382/100 |
| 7,242,850 B2 * | 7/2007 | Cok | 386/241 |
| 7,302,162 B2 * | 11/2007 | Beaton | 386/94 |
| 7,324,646 B1 | 1/2008 | Burstyn et al. | |
| 7,634,134 B1 * | 12/2009 | So | 382/173 |
| 7,728,950 B2 * | 6/2010 | Willis | 352/40 |
| 2005/0129230 A1 | 6/2005 | Mihota | |

FOREIGN PATENT DOCUMENTS

| | | |
|---|---|---|
| JP | 10-210400 | 8/1998 |
| JP | 2004-266345 | 9/2004 |
| WO | WO 99/08155 | 2/1999 |
| WO | WO 99/67950 | 12/1999 |

OTHER PUBLICATIONS

PCT/US06/22364—PCT International Search Report and Written Opinion dated Mar. 27, 2008, in 6 pages.

JP Non-Final Notice of Reasons for Rejection (Dispatch on Jun. 15, 2011).

* cited by examiner

METHOD AND APPARATUS FOR INHIBITING THE PIRACY OF MOTION PICTURES

CROSS REFERENCE TO RELATED APPLICATION

This application is a U.S. National Phase of PCT Application Number PCT/US2006/022364, filed on Jun. 8, 2006, designating the United States of America and published as International Publication No. WO 2006/133376 A2 on Dec. 14, 2006 in the English language, which claims priority to U.S. Provisional Application Ser. No. 60/688,466, filed Jun. 8, 2005. The disclosures of the above-referenced applications are hereby expressly incorporated by reference in their entireties.

FIELD OF THE INVENTION

The present invention relates to a method and apparatus for inhibiting the piracy of motion pictures and, more particularly, to a method and apparatus that degrades the quality of motion pictures illicitly recorded by a video camera in a theater.

BACKGROUND OF THE INVENTION

According to the Motion Picture Association of America ("MPAA"), the piracy of motion pictures has grown to the point where it has cost the Industry (and the U.S. economy), in hard goods alone (e.g. DVDs) approximately $3.4 billion in 2003, up from $2.2 billion in 1998. According to a report by Solomon Smith Barney, the cost of piracy reached $5.4 billion in 2005. The MPAA further states that 90% of that loss, in the critical first 6-8 weeks of a given title's release, is due to unauthorized camcording of movies in theaters with subsequent duplication and illicit sales in DVD form. Additional losses occur elsewhere (e.g. on the internet and via VHS videocassettes).

In an address delivered to the Society of Motion Picture and Television Engineers ("SMPTE") on May 17, 2005, an executive in change of anti-piracy efforts for a major motion picture studio stated that "good pirate DVD copies are available on the black market within 14 days of a movie's release." Sometimes, in fact, pirate DVDs duplicated from masters camcorded at advance screenings appear on the street, or on the internet, before the movie actually opens.

The problem is so severe that the MPAA members have even openly discussed the possibility of releasing movies to the DVD market and to theaters on the same "day-and-date," which would obliterate the usual "window" of theatrical primacy. If that were to happen, many experts say that the theatrical exhibition industry would suffer massive losses and might be forced to close as many as 50% of the theaters in the United States alone. The economic losses due to all of this could thereby vastly exceed the losses suffered by the MPAA members, as well as drastically altering the nature of cinema itself.

Much of this illegal duplication, distribution and smuggling of stolen intellectual property is perpetrated by internationally based organized crime gangs that are, concurrently, also engaged in drug trafficking. It has been said that, pirates actually make more money from illicit DVDs than they do from heroin, with far less risk of punishment, if any. In places like Russia, Indonesia, Malaysia and China, experts suggest that more than 90% of the DVDs purchased by consumers arise from pirated content.

In conjunction with the MPAA, film laboratories now use forensic "watermarking" technology to identify specific film prints that are distributed to theaters, a practice that allows law enforcement to trace pirated movies to the theaters from which they were stolen. But by the time the movies are traced, the piracy has already occurred and the damage is done. Watermarking does little more than provide law enforcement a clue to the scene of the initial crime. Pirates are mobile and can capture movies at a variety of sites all over North American and beyond. Accordingly, a long felt need exists to hinder, if not inhibit, the ability of pirates to capture movies in theaters.

When considering the technological challenges of video cameras shooting images projected by film and digital projectors in theaters, it is necessary to consider the differences between film and digital projection in theaters and the basics of video capture of the sort used by pirates.

Film cameras and projectors typically photograph and display images at the rate of 24 still photos per second, each one of which is captured by the camera in about $\frac{1}{50}$th of a second. But, typically, film projectors then display those images by showing each image or "frame" twice. In other words, the film going public sees a series of 24 separate images every second in 48 flashes of light interrupted by moments of darkness during which the film projector's shutter cuts off all light on the screen. The rotating shutter of a film camera is typically set at 180° so as to provide an approximate 50th of a second exposure every $\frac{1}{24}$ of a second; a 50% duty cycle. But theatrical film or digital projectors show these images differently. Whereas with film cameras, a 180° exposure is followed by 180° of shuttered darkness, in the projector, those moments of darkness are bisected into two 90° intervals that are placed equidistantly apart from one another. Thus, a normal projection sequence for one frame would be:

$\frac{1}{96}$ sec. of dark, $\frac{1}{96}$ sec. of light, $\frac{1}{96}$ sec. of dark, $\frac{1}{96}$ sec. of light=total time $\frac{1}{24}$ second.

Or, stated in decimal equivalents:

0.0104 sec. dark, 0.0104 sec. light, 0.0104 sec. dark, 0.0104 sec. light=total time 0.041 second.

The duty cycle of a film camera looks like a circle bisected into 180° segments, with each segment signifying: (1) exposure; and (2) composition, and viewing while the next increment of film is pulled into position and registered in the camera gate. The duty cycle of a film projector looks like a circle bisected by two wedges on opposing sides—a bowtie—representing the pulldown interval of 12 ms, and a like interval mirrored at 180° that represents the display interval and the shutter cycle.

The moments of darkness that occur during shuttering are not seen by the public because of a phenomenon called persistence of vision, first observed by Aristotle in ancient times. Persistence of vision is the tendency of the "eye" to see images for a few moments after the retina senses them. Thus, people are usually unaware of the blinking of their own eyes.

The reason for the double-display of each image that comprises "motion pictures" is that shuttering of those 24 images at a rate of 24 flashes of light and dark would result in a noticeable flicker to the majority of viewers. A higher flicker rate, 48 flashes of light and dark, however, appear as a constant flow of images to the majority of viewers because the flash rate is faster than their persistence of vision.

This so-called "critical flicker frequency" occurs as a result of one's persistence of vision. The critical flicker frequency can best be explained as the phenomenon that occurs when rotating a cylinder, half of which is painted black, the other half of which is painted white. As the cylinder is rotated, one first sees black, then white, and so forth. But as the rotational speed increases, one's persistence of vision eventually causes the incoming images to fuse together and the eye begins to see grey. The critical flicker frequency is the frequency in which the black and white sides of the rotating cylinder appears grey to the eye. Critical flicker frequency, also sometimes referred to as "flicker fusion threshold," can also be defined as the transition point of an intermittent light source where the flickering light ceases and appears as a continuous light. There are a multitude of factors that determine our perception of flicker that includes the intensity and size of the test stimulus. Likewise, in movies, at the critical flicker frequency of 48 flashes per second, one sees a continuous flow of images, each one merging into the next.

Some theatrical projectors have a three-bladed shutter that generates a flash rate of 72 flashes-per-second (three flashes of light for every film image). Three-bladed shutters are sometimes used in smaller screening rooms to reduce light levels on an overly bright screen, but it is also used to eliminate all vestiges of flicker. Sometimes, on very large screens with very bright scenes, image flicker that occurs with a double-bladed shutter can be eliminated with a three-bladed shutter. Some major motion picture studios have screening rooms that employ three-bladed shutters because of this, but they are rarely used in commercial settings because they require higher light levels to yield the same brightness on screen, which is more costly for theatrical exhibitors because of the high cost of xenon bulbs and the additional electricity required to power them.

Three-bladed shutters were common in the days of silent movies, where the more-or-less standard 16 frames-per-second capture rate was insufficient to reach the threshold of the critical flicker frequency. So by using a three-bladed shutter, 16×3=48 flashes-per-second, the critical frequency was attained. When sound was introduced in 1929-1930, it was necessary to increase the frame rate to 24 in order to enable the recording of intelligible analog sound on film. At that point, it became possible to make use of a double-bladed shutter and still reach the critical flicker frequency of 48 flashes-per-second.

The 72 flash-per-second model that one would see when using a three-bladed shutter with standard 24 frames-per-second motion pictures would rise to 144 flashes-per-second if used with the non-standard frame rate of 48 frames-per-second, currently under consideration by some filmmakers and others in the motion picture industry.

In all these instances, the display rate of the individual film images and the film projector's flash rate on screen are at variance with the various standards for video capture. Also, it is important to consider the fact that most video cameras "integrate" an image (equivalent to the exposure interval in film cameras) in about 33 ms, given optimal brightness. If a video camera is confronted by less than optimal brightness, greater "gain" is provided to the CCD or other capture means so as to increase sensitivity, but such additional gain also generates a higher degree of video "noise," which is more-or-less equivalent to the greater "grain" evident in "faster" film stocks. Conversely, when a higher than optimal amount of light is present, video cameras bring it down so as to fall within their useful dynamic range by employing an electronic shuttering means. The electronic shutter method adjusts the 33 ms integration period to something less than 33 ms to adjust for this increased light level.

Some video cameras, such as those manufactured by Canon, have a new shutter speed control called "clear scan." This option is designed to adjust the camera shutter speed based on alternate scan frequencies, such as those presented by televisions or computer monitors. The clear scan shutter speed has a range from 60.5 Hz to 201.5 Hz with 120 steps in between. However, once this speed is set it operates in a symmetrical manner and would require a return to a set-up menu to make further adjustments.

Therefore, even if the pirate is using a Canon camera equipped with "clear scan" adjustments, opportunities exist with the present invention to use combinations of altered display intervals, phase shifted with non-standard shutter intervals. Also, in accordance with the invention, altered patterns, cadences and/or shapes may be used to confound the ability of camcorders to capture film and digitally projected images on screen.

Digital projectors are now making an appearance in a few theaters. But they do so without using light-blocking shuttering as is common with film projectors. Such shuttering is unnecessary because there is no need for new media (film) to be pulled into position in front of an aperture, an operation that must be hidden by shuttering. Rather, such devices project a near constant stream of ever changing images that correspond to standard frame rates for film, video and/or any non-standard frame rate. For that reason, pirates who are camcording movies projected by such digital systems get an even better image than when they steal film projections.

U.S. video cameras typically capture video at the rate of 29.97 frames-per-second (usually, and erroneously, said to be 30 frames-per-second), which generates an NTSC standard with an interlaced image that has, in total, 525 lines of resolution per frame, in 60 fields (each video frame is composed of two fields). Not coincidentally, the 60 frame-per-second architecture of U.S. television matches the 60 Hz frequency of North American electrical power, whereas the 50 Hz basis of European power coincides with their 25 frame-per-second video frame rate, which is composed of 50 fields.

The discrepancy of the frame rates between film and video creates a problem if one tries to photograph an ordinary television with a film camera running at the standard 24 frames-per-second. The resulting film shows black bars rolling through the film's depiction of the television picture, as if the television set's horizontal hold control was failing. This is the result of the film camera's under-sampling a higher frame rate, which results in revealing the TV blanking interval. In order to capture a television image on film, it is necessary to synchronize both film camera and video display to 24-frame video on the television (specially converted for this specific purpose, using specialized video equipment) or use a specific, non-standard shutter angle in the film camera. Movie pirates are doing the reverse of that when they photograph 24-frame film with video cameras that operate at either "30" frames-per-second, 25 frames-per-second, or in some cameras at the so-called 24 frames-per-second "progressive" (non interlaced) mode, or at 30 frames-per-second progressive, 60 frames-per-second progressive.

Because of frame rate discrepancies, the process of transferring film to video is a tricky business that involves precise timing between the film's movement and the video capture systems used by major postproduction facilities. Professional telecine systems, such as those from Cintel (illustrated in FIG. 1) or Philips, accomplish the task in a very precise manner, for example, using a "3:2 pulldown" scheme illustrated in FIG. 2. But as tricky as it is to transfer 24 frame-per-second film to 30-frame video on a professional level, and as costly and sophisticated as telecine systems are, it is remarkable how well the job can be done with small, cheap, readily available consumer level camcorders.

The bulk of piracy is accomplished with such consumer cameras, particularly those that record onto mini-DV tape (as shown in FIG. 3), which is easily converted to DVD for duplication. Some newer camcorders can even record directly to DVDs (such as the cameras shown in FIG. 4 and FIG. 5), directly onto internal hard-drives, on onto removable "flash memory" devices, which could further facilitate the ability of thieves to quickly duplicate and sell stolen movies.

Pirates gain entry to theaters with their cameras hidden in bags and/or purses or, commonly, under coats that evade scrutiny of theater staff. Professional cameras, being significantly larger and heavier, are more difficult to hide. So consumer cameras, from both low-end single chip models through high-end 3-chip models and various high definition formats can be assumed to be the means of capture by most pirates. In the U.S. most such cameras capture images in accordance with the NTSC "30" video frames (actually 29.97) composed of 60 video fields (one video frame equals two fields). There are also many digital cameras and capture devices that can operate in various modes, including both interlaced and progressive scan; cameras designed to operate at 24p (24 frames-per-second progressive scan, really 23.98 frames-per-second), 30p (30-frame progressive); and PAL camcorders that operate at 25 frames-per-second (interlaced), are also used, with further resolution choices that include standard 525 NTSC, but also 1080i, 480p, and 720p and 1080p. There are also cameras that have variable frame rates from as high as about 5,000 frames-per-second down to almost zero.

Interlacing means that each video frame is composed of two fields of information wherein the odd lines are traced first, followed by a moment's "blanking." Even lines are traced thereafter, or vice versa. Some video cameras are also capable of operating without interlacing and capture images in one fell swoop, with "progressive" scanning at 24 images-per-second (referred to as "24p"). In this manner both even and odd lines are traced in one "progressive" pass. In Europe, of course, camcorders are available that operate at the PAL standard of 25 frames-per-second, or with SECAM standards. Anti-piracy experts say that PAL camcorders produce pirate masters that are superior to those made with NTSC.

But however the digital video master is acquired, regardless of the format used by the camcorder, such digital video masters are the beginning of the chain of criminal theft of intellectual property that then stretches around the world and down onto the streets of cities everywhere. Efforts to quell duplication, distribution and sales of illicit copies of movies all take place after the fact of the initial theft from theaters, and that is where the present invention seeks to stop this costly shoplifting.

SUMMARY OF THE INVENTION

The present invention provides a method and apparatus to inhibit the piracy of motion pictures in theaters by taking advantage of the frame rate discrepancies between film (or digital) display and video camcorders. By alternating specific image display intervals and shuttering cadences, or with digital video projectors commanding a similar modified display via the digital projector's blanking and display capabilities, so that the projected images occur in a random and/or phase shifted manner, objectionable distortions are produced in an illicitly captured video image, while being invisible to theatrical viewers. In addition, various serrated, slit, multi-quadrant or spotted patterns may be used on mechanical shutters, or simulated on digital displays, to further degrade the quality of illicitly captured video by pirates in theaters.

The method in one embodiment is comprised of displaying an image for an interval, followed by an interval of darkness where no image is displayed, and selectively changing the intervals of image display and the intervals of darkness, such that a camera intended for use in illicit recording of the motion picture captures intervals of darkness, and wherein the camera also captures fewer displayed images than would be captured if the intervals of image display and darkness in the motion picture were the same.

The apparatus in one embodiment comprises a controller that commands the projector to display an image for an interval, followed by an interval of darkness where no image is displayed, and that selectively changes the intervals of image display and the intervals of darkness, such that a camera intended for use in illicit recording of the motion picture captures sufficient intervals of darkness, and wherein the camera also capture fewer displayed images than would be captured if the intervals of image display and darkness in the motion picture were the same.

Other features and advantages of the present invention will become apparent from the following description of the invention, taken in conjunction with the accompanying drawings, which illustrate, by way of example, the principles of the invention.

DETAILED DESCRIPTION

In one embodiment, the present invention relates to a method and apparatus for controlling a film transport system for a theatrical motion picture projector and, more particularly, to a film projector movement that is capable of changing the intervals of image display and shuttering (or blanking) of the projected image in such a way as to act as a barrier to would-be pirates seeking to steal the movie in theaters with hidden cameras. In another embodiment, the present invention relates to a system and method for controlling a digital projector to achieve the same result.

Figure 6:
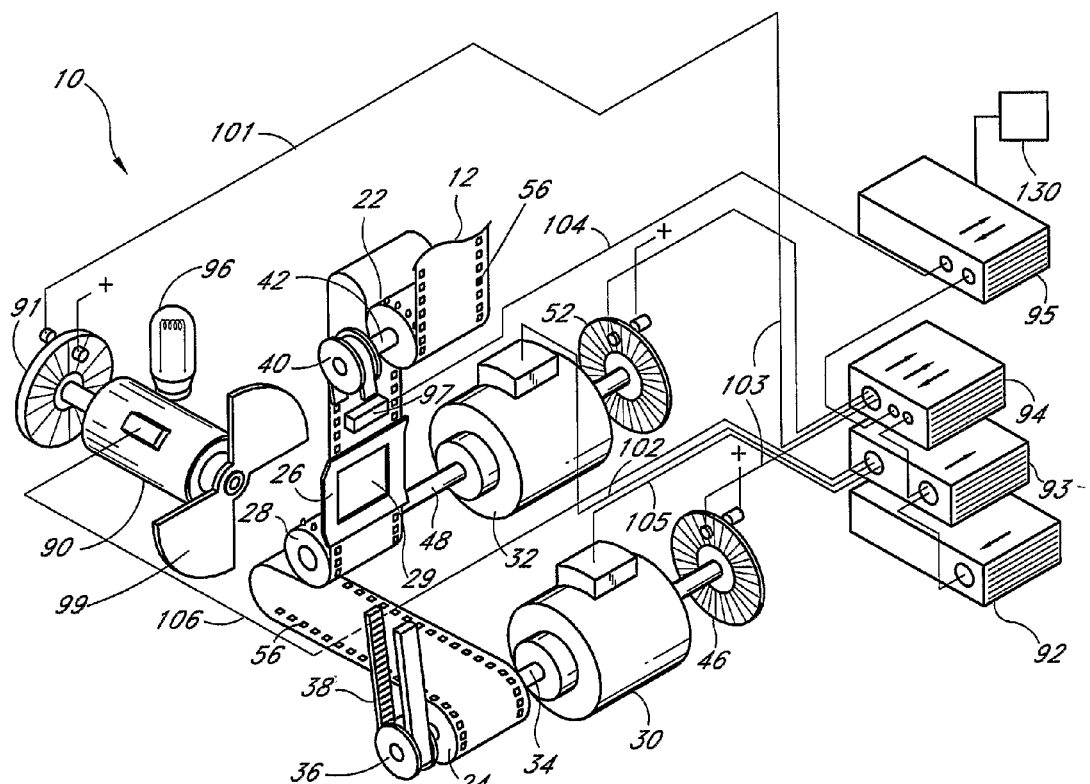
FIG. 6 illustrates one embodiment of a film transport system useful for practicing the invention.

Referring to FIG. 6, the film transport system, generally referred to by the reference number 10, transports film 12 through a projector. The film transport system 10 includes two constant speed sprocket, comprising a feed sprocket 22 and a hold-back sprocket 24, located on opposite sides of a film gate 26. An intermittent sprocket 28 is located immediately below the film gate 26 and between the constant speed sprockets 22 and 24 to advance the film 12 intermittently, frame-by-frame, through the film gate 26 in the usual manner. Thus, the intermittent sprocket 28 registers each frame of the film 12, with customary precision with the film gate 26 at the U.S. standard rate of twenty-four-frames-per-second, or at another rate as may be desired.

Conventional 35 mm theatrical motion picture projectors employ a motor 32 to drive the intermittent sprocket 28. During the period of film movement, a rotating shutter 99 driven by a constant speed motor 90 blacks out the screen to prevent blurring that would be seen if the frame were illuminated while being moved out of the aperture 29 as the succeeding frame is moved in. As previously explained, the viewing audience is unaware of these moments of darkness due to the phenomenon know as "persistence of vision." Film is supplied to and taken away from the film gate 26 and intermittent sprocket 28 by the constant speed sprockets 22 and 24 on either side. The intermittent film movement created at the film gate 26 is smoothed out by film loops on either side of the intermittent sprocket 28, which are maintained by the constant speed sprockets 22 and 24. The constant speed sprockets 22 and 24 are driven by a motor 30.

Current theatrical projectors are almost exclusively of the mechanical type. Typically, a single synchronous motor drives a drive shaft bearing multiple drive gears, which drive the shutter as well as the constant-speed and intermittent sprockets at a single speed corresponding to the U.S. standard frame rate of 24 frames-per-second. The intermittent sprocket is driven by a device called a Geneva mechanism (not shown), the purpose of which is to translate one full revolution of the drive shaft into a ninety-degree rotation of the intermittent sprocket followed by a stationary period for image projection. The ninety-degree rotation of a sixteen-tooth sprocket results in a four-perforation frame change (i.e., one "pulldown"). The four-perforation frame standard was established in the late 1800's to accommodate a projected aspect ratio of 1.33:1 and has not changed since that time. Consequently, commercial 35 nm projectors are designed for four-perforation pulldown at 24 frames-per-second. While the vast majority of theatrical 35 nm projectors are of this mechanical design, there are several specialty projectors on the market, notably from Kineton of Germany, which feature electronic pulldown. These designs rely on a high response servomotor instead of the Geneva device to advance and position the film in the film gate.

Newer and more flexible and efficient designs have been disclosed in U.S. Pat. No. 5,946,076 (Goodhill, et al) and U.S. Pat. No. 6,019,473 (Goodhill, et al), which are incorporated herein by reference, and it is these designs that form the basis for certain embodiments of the present invention, as described below.

In one such embodiment, a motion picture projector, also referred to as a film projector movement or "head," which is designed for the theatrical frame rate of 24 frames-per-second, or for more advanced projection at 48 frames-per-second, or otherwise, is controlled in such a way as to cause the image display intervals and shuttered moments (intervals) of darkness to advance or retard in a random, phased-shifted manner.

The film transport system 10 generally includes a motive element that rotates the sprockets 22, 24 and 28 and moves the film 12 in a frame-by-frame manner past the aperture 29 in the projector. In one embodiment of the invention, the rotational speed of the pair of sprockets 22 and 24 is determined by a variable speed motor 30, and the rotational speed and positioning of the intermittent sprocket 28 is determined by a high-response servomotor (intermittent servomotor) 32. In this embodiment, these two motors 30 and 32 comprise the motive element of the film transport system 10. If desired, however, a single motor or three motors (or more) may be used as the motive element. Also, in the present invention, one motor 90 or a plurality of motors may be employed to rotate one shutter blade 99 or a plurality of shutter blades. Alternately, a control system (described below) may command the activation of other shuttering devices, including but not limited to various types of light valves, mirrored digital devices, or other light gating systems. Such alternate shuttering devices may also include a light source that is, in itself, pulsed in a coordinated manner with the projector. Thus, such a pulsed light source would eliminate the need for a blocking, or other gating devices.

The shuttering must be maintained in synchronous operation with the film transport. As taught in prior art and as modified hereby, a change in the film frame rate may require a corresponding change in the shutter rotational speed, or in the present invention, in the transmission by the control system of a signal to actuate alternate shuttering devices.

In accordance with the invention, the control system is adapted to regulate the motive element and thereby maintain or change the intervals of frame or image display and/or intervals of darkness (shuttering) where no image is displayed so as to substantially maintain an average frame rate consistent with that established for the viewing of the motion picture in question while phase-shifting the cadence and/or image display and shutter (blanking) intervals and/or spacing in such a way as to degrade the quality of the movie recorded by a video camcorder in a theatrical screening.

Figure 1:
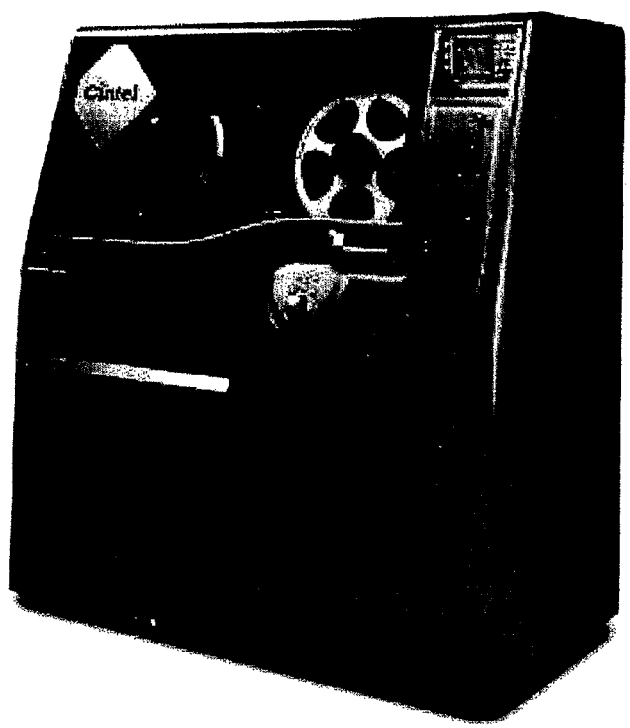
FIG. 1 is an example of a Cintel telecine machine.
Figure 2:
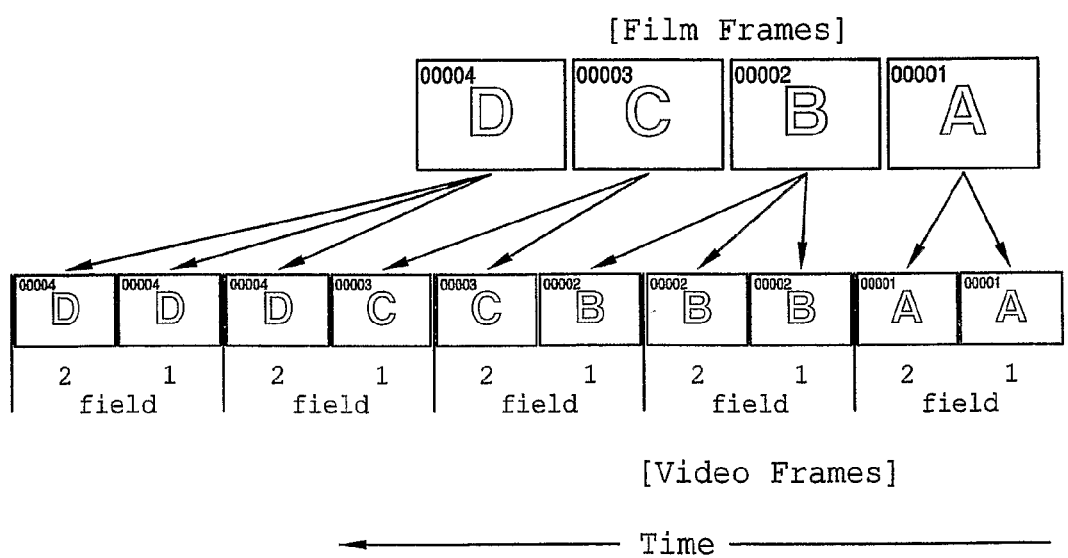
FIG. 2 schematically illustrates a 3:2 pulldown used for converting 24 frames-per-second film to 30 frames-per-second video.
Figure 3:
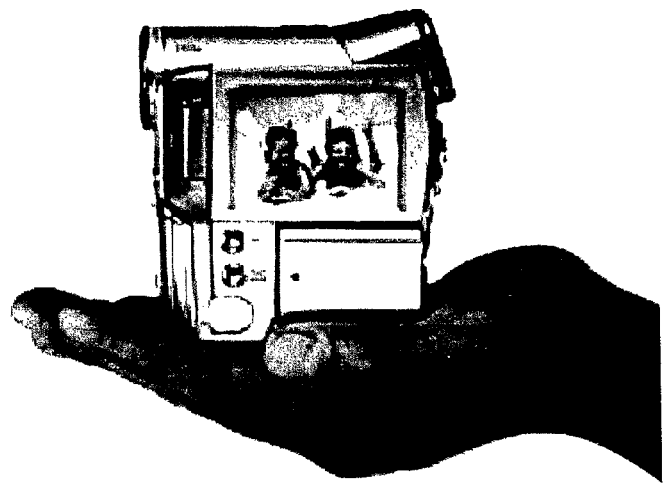
FIG. 3 is an example of a commercial mini-DV camcorder.
Figure 4:
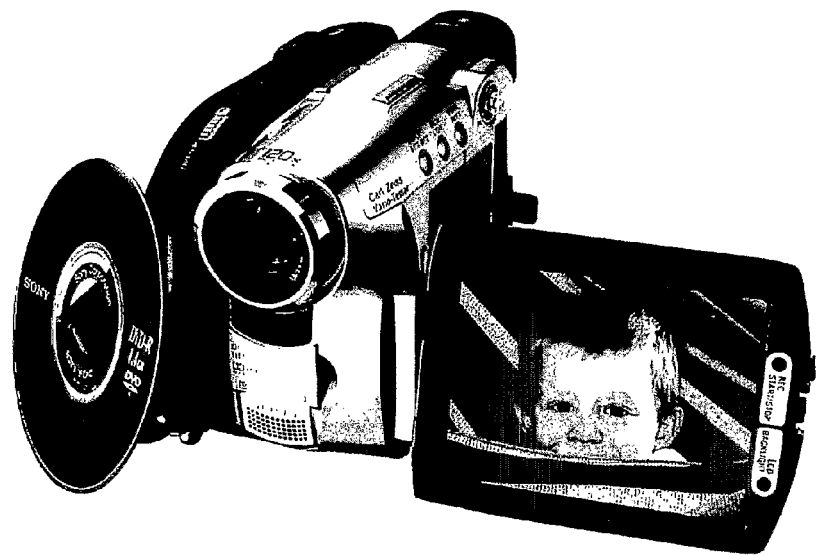
FIG. 4 is an example of a commercial DVD camcorder.
Figure 5:
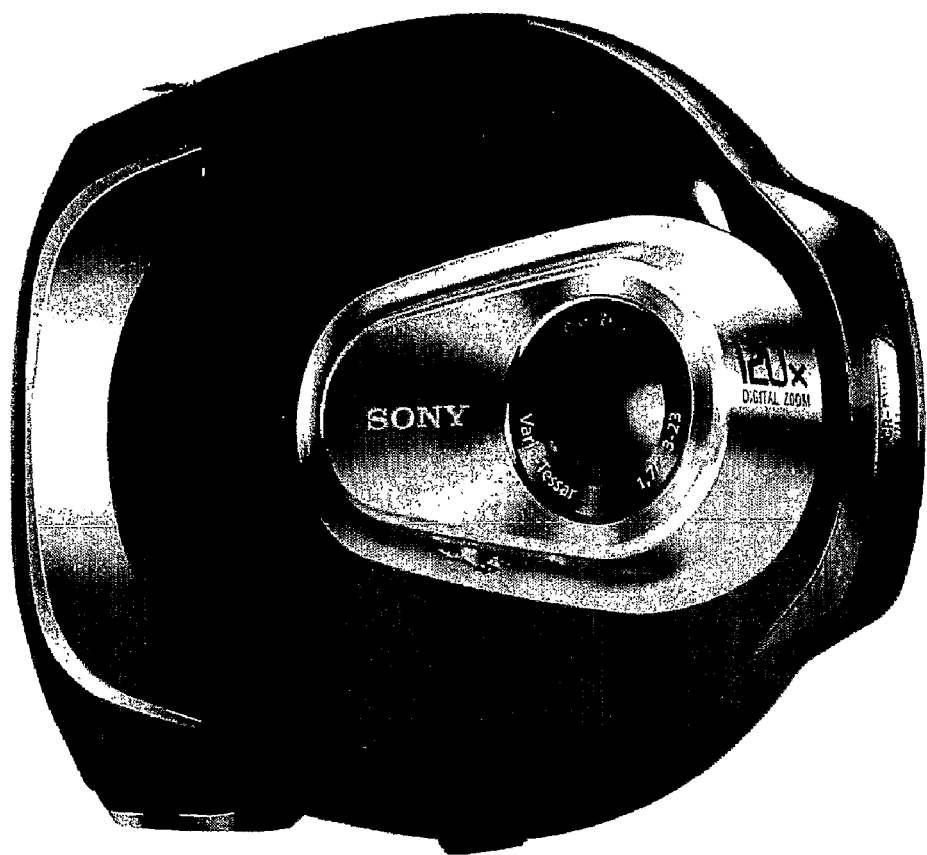
FIG. 5 is an example of another type of commercial DVD camcorder.

As noted above, the control system for the embodiments of the present invention is based on the control system disclosed in U.S. Pat. No. 6,019,473. As disclosed in that patent, the control system comprises a host computer (CPU) 95, a motor controller 94, a motor amplifier 93 and a d.c. power supply 92. The motor controller 94 includes controllers for the variable speed motor 30, the servomotor 32, and the shutter motor 90. The control system controls the operation of theses motors, which, in turn, controls the operation of the sprockets 22 and 24, the intermittent sprocket 28 and the shutter 99 to allow the film transport system to change from one film format to another, such as a format in which each frame spans four perforations to a format in which each frame spans three perforations. FIG. 6, described herein, is taken from and is the same as FIG. 4 in U.S. Pat. No. 6,019,473.

Beyond the possible operational changes necessary for alternate frame rates and/or film formats, as taught in U.S. Pat. No. 5,946,076 (Goodhill et al) and U.S. Pat. No. 6,019, 473 (Goodhill, et al), in the present invention, the control system is adapted to vary the image display intervals and durations as well as the shuttering intervals and durations. The control system may also deploy alternate shutters, some with serrations, slots, perforations, or other features that may include filtering materials that selectively pass some portions of the light spectrum (e.g. infrared) while blocking others. Also, the filtering material may include a pattern that identifies a code specific to that particular projector so that any attempt to capture a clear illicit video would not only fail qualitatively, but also identify the site at which the initial theft attempt took place.

Additionally, the control system may activate dynamic coding means (including use of a separate digital projector, connected to the controller and slaved thereto) that creates a watermarking stamp that appears in the seemingly "dark" shuttered intervals, using selected portions of the light spectrum, that identifies forensic information, such as the time the attempted theft took place, or the individual that authorized the projector's operation. In this way, unauthorized operation of the projector, after hours by employees, could be tracked to the individuals that unlocked the projector's operation. In this alternate system, each projector would require a projectionist to enter a password to unlock the projector prior to every showing. Given the criminal consequence of unauthorized showings, the projectionists would be motivated to keep their individual passwords secret because they would then bear responsibility for any efforts to steal the movie.

The aforementioned film projector control system coordinates the output of the variable speed motor 30, the intermittent servomotor 32 and the shutter motor(s) 90 and/or triggering of alternate shuttering devices and would be adapted to vary shuttering and display intervals and/or cadences. Further, a trigger signal 104 for such alternate shuttering and display modes may be information that is encoded on the film strip and read by a sensor 97.

Based on the type of trigger signal 104 that is received, the control system may change the speed of the shutter motor 90 and the output of the variable speed motor 30 that, in turn, changes the rotational speed of the pair of sprockets 22 and 24 as well as the incremental rate of display and/or advancement of the film frames, and/or the precise image display intervals and shuttering intervals and cadences.

The trigger signal 104, as generated by whatever means (e.g. a trigger strip between the frames, on the side of the film, between the perforations or contained within the audio data storage means as additional data) is designed to indicate when the film changes format, such as when there is a change from film having frames spanning four perforations per frame to film having frames spanning three perforations per frame, or a change of specified frame rate from 24 frames-per-second to 30 frames-per-second, or 48 frames-per-second or both changes together. In the present invention, such codes also control the intervals of image display and the intervals of darkness where no image is displayed. As taught in the prior art, the trigger signal 104 can also be representative of a change between many different kinds of formats and, in general, is designed to indicate when the film format in the projector changes from a format having frames spanning one predetermined number of perforations to a format having frames spanning another different predetermined number of perforations, or from one predetermined frame rate to another predetermined frame rate, or both changes together.

The trigger signal 104 to indicate a change in film format can be generated in a number of ways. In one embodiment, a sensor 97 coupled to the control system generates the trigger signal electronically. The sensor 97 may be designed, for example, to read encoded information carried by the film 12 as it enters the projector to indicate a change in the film's format. This information may be encoded on a foil or magnetic strip, an optically read code, or by mechanical or other appropriate means, including a code included in the binary information between the frames. Such binary codes are disclosed in U.S. Pat. No. 6,450,644 B1, and designated therein in FIG. 10. The code so imprinted could reference a lookup table that is included in an outboard disk or other digital storage media (including but not limited to a CD, DVD-audio, or a flash memory device) that would not only contain the movie's audio information, but would also control sequences of the movie that could, by virtue of the specific on-screen action contained therein, be subjected to greater or lesser degrees of alternate image display and/or shuttering intervals and/or cadences, if any at all. For example, the visual quality of sequences with extremely quick action might be adversely affected by such alternate image display and shuttering intervals and/or cadences, while sequences with a lesser degree of action might show no perceivable degradation. In such circumstances, the filmmakers may chose to confine alternate image display intervals and shuttering cadences to sequences that do not interfere with the quality of the experience seen by the public in legitimate theatrical screenings. As long as a substantial portion of the movie can be protected from camcorder-based piracy, the goal of the present invention will have been met.

As stated above, with prior art, motion pictures are seen in theaters as a series of 24 discrete images in 48 symmetrically projected flashes of light. Each such flash takes place in regular intervals. But with the present invention, using (in its preferred embodiment) a projector of the type disclosed in U.S. Pat. No. 6,019,473, a control system would be adapted to modify both the constant speed sprockets 22 and 24 to adapt to randomized film advance by means of the intermittent sprocket 28, or via a reciprocating mechanism. Concurrently, the shutter 99 would match this randomized and/or phase shifted display architecture.

The shutter 99 may be modified in its design and shape(s) including, but not limited to, separating the two sides of the "bow tie" into two or more counter-rotating leaves, the purpose of which would be to more rapidly open and close the flow of light onto the aperture 29. Alternately, a mechanical shutter could be eliminated altogether and replaced by a pulsing light source, or by reflective gating (e.g. using the Texas Instruments mirrored digital device, known as a Digital Light Processor or DLP chip).

Another possible method to further confound video camcorders is to vary the shape of projector shutters. At the moment, film projector shutters are designed to cut off and turn on light in the quickest possible manner. The typical bow-tie shutter 99 looks like its namesake, as can be seen. Typically, it is as pictured: a single piece of metal that spins in one direction to both cut off and open up the light flux flowing through the projector's aperture 29 in a clean, linear stroke. Some shutters have only one light-blocking blade, rather than the bow-tie shaped dual bladed device, and in that instance such shutters spin at twice the speed of bow-tie models to achieve the same effect. But, as noted above, both such mechanisms could be replaced with a shutter with edges that have holes, slits and/or serrations formed in a complementary, mirror image pattern on opposing shutter blades. Similar patterns could be created on a pulsed light source or on a source that relies on mirrors or other types of light valves.

Such a shutter could, on average, succeed in transmitting the same amount of light over a given second, but do so by painting the screen with the image in streaks or spots. The human visual cortex could be relied upon to put it all together, within parameters that would be established with experimentation. Pirate video cameras, by contrast, might "see" those streaks and/or spots and record them as such, along with coded forensic information, if desired. Of course, serrated or patterned shutters would be less efficient in terms of the totality of light transmitted to the screen. Accordingly, a brighter xenon bulb (or other light source) and/or a more efficient lamphouse would be essential in order to maintain or exceed the standard SMPTE standard of 16 foot lamberts on screen.

Regardless of the shutter-edge shape or other mechanism or device(s) used, randomization of image display intervals and/or shuttering cadences would function such that in any given second, or in the span of a few seconds, the viewer would still see an average of 24 (or 25, 30 or 48 or more) frames-per-second in the same 48 (or more, e.g. 72) flashes of light, so as to correspond to the frame rate of the cameras or digital devices used to create them. But the duration of the display of those images or flashes would not comprise precisely the same interval, from frame-to-frame or from flash-to-flash or with respect to intervals of shuttered darkness.

As a result, the shuttered moments of darkness would not appear in a predictable, symmetrical pattern, as is now the case. For example, with 24 frames-per-second cinema, which is seen in 48 flashes of light, each flash is of equal duration, and each period of darkness is likewise of equal duration. For example, stated in decimal equivalents, the current display architecture of film-based cinema projection is:

0.0104 sec. dark, 0.0104 sec. light, 0.104 sec. dark, 0.0104 sec. light=0.0416-second total time.

A phase modified sequence in accordance with the teachings of the present invention would look like the following two sequences:

0.0094 sec. dark, 0.0114 sec. light, 0.0094 sec. dark, 0.0114 light,
0.0104 sec. dark, 0.0104 sec. light, 0.0104 sec. dark, 0.0104 light.

Each sequence takes 0.0416 seconds to complete but after the first sequence the phase has changed by 0.002 seconds, or approximately 5%. Repeating this pattern over time will advance the phasing forward, and reversing the pattern will retard the phasing.

By presenting the usual moments of darkness at slightly different intervals than is customary, in different and unpredictable patterns, and by asymmetrically randomizing the timing of both the dark moments and the longer or shorter image display intervals or the flashes of the images themselves, the pirate video camera would be confronted by an image that would, on frequent but random occasions, "see" and record a dark screen, or portions thereof.

As noted above, additional degradation to a pirate video might result from the use of shutter blades with serrated edges or other non-standard shutter patterns or shapes, or their equivalent with pulsed, reflected or otherwise gated light sources. Depending on the skew rate of this random display and shuttering architecture, the illicit video would thus contain dark flashes, streaks, dots and/or sustained intervals of darkness, interspersed by viewable images, possibly with "rolling" bars between them, or possibly appearing in a vertical pattern due to the vertical sweep of film projectors' shutters.

Figure 7:
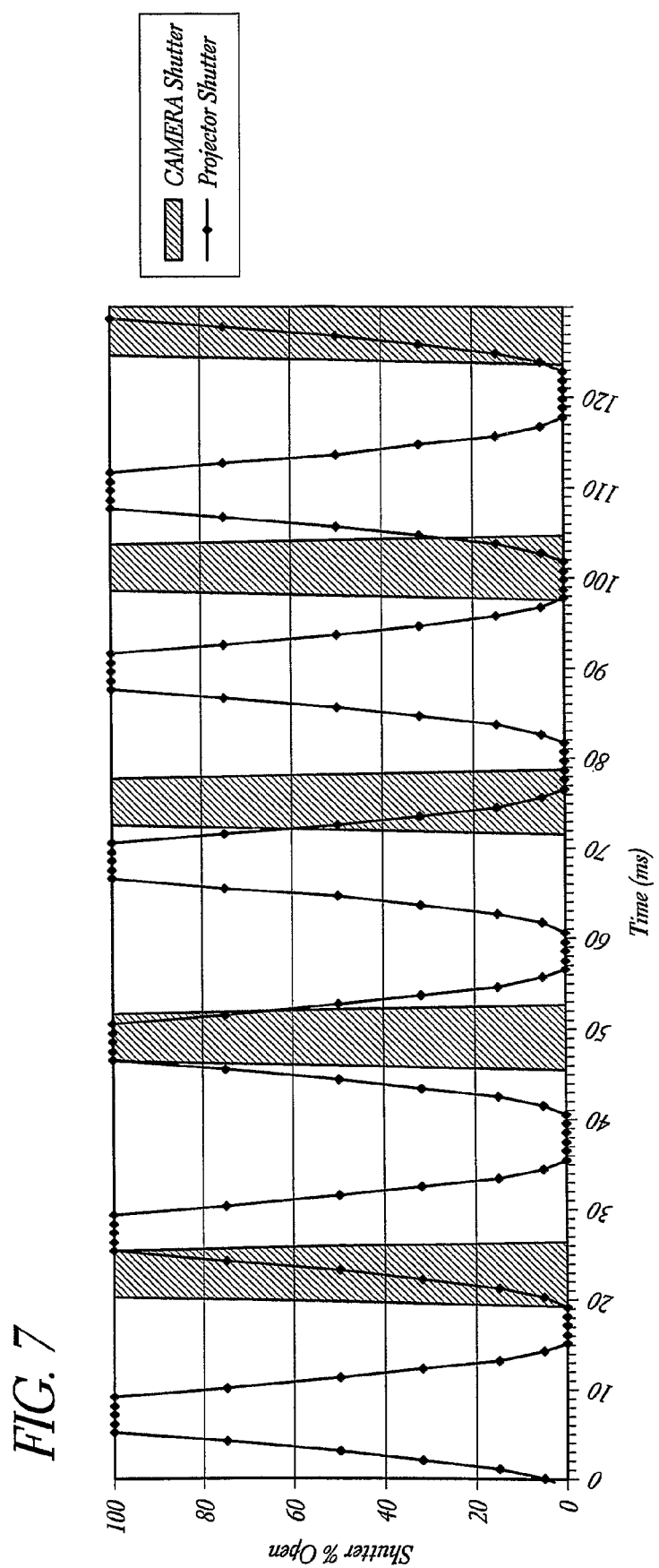
FIG. 7 is a graph showing one embodiment of a shutter timing scheme in accordance with the invention.

Initial test data bears out the viability of some aspects of this strategy. FIG. 7 shows a graph that represents observed distortion to video recording. The shaded columns in the graph represent the video camera's apparent capture interval ("shutter"), while the dotted line traces the projector's shutter profile. In the graph, the horizontal axis shows time in milliseconds and the vertical axis shows the amount that the shutter is open in terms of percentage. When the projector shutter is fully open (100%, at the top), the video camera's exposure coincides with a fully illuminated screen in the $4^{th}$ event plotted, while missing the illuminated screen completely in the instance before that, with the video camera's first two exposures seeing only a partially illuminated image on screen. With a very slight variation in the display and shuttering of the film image, the video camera's exposure cycle sees some images correctly, sees others with diminished brightness, and sometimes records no image at all. Further skewing of the display and shuttering intervals could further inhibit the ability of a video camera to record film projection with an image that has any useful commercial value to criminal pirates.

The method described would also be adapted to digital projectors, which could be outfitted with shutters like film projectors. Alternately, digital projectors could simulate the shuttering of film projectors via altered blanking schemes (e.g. using the imaging chip themselves) to transmit, in an alternating manner, serrated or spotted patterns or a combination thereof. In fact, it should be noted that the technology used by the Texas Instruments' so-called "DLP" chip sets involves the controlled shuttering of millions of micro-mirrors that physically move to reflect or deflect light in proportionate response to the images they are tasked with recreating.

The present invention would control the output of a digital projector so as to present an intermittent image on screen, similar to that created by a film projector as adapted by the present invention, with streaks, spots and other anomalies that would be unseen in the theater by the human eye but captured by pirates' camcorders.

Generally, the preferred embodiment makes use of a Switchable Format Film projection system, such as that taught in U.S. Pat. No. 6,019,473. The precise details of that projection system can be found in that prior art. The present invention takes all the capabilities of that design and adds additional functionality that will inhibit piracy via video cameras in theaters. However, other types of electronic servo motor controlled projectors, such as those made by Kinoton, could be modified with the control technologies and methods set forth herein, but they would lack the wide range of flexibility as to frame rates and film formats as that provided by the preferred embodiment.

While a particular form of the invention has been illustrated and described, it will be apparent that various modifications can be made without departing from the spirit and scope of the invention. Accordingly, it is not intended that the invention be limited, except as by the appended claims.

What is claimed is:

1. A method of inhibiting the piracy of a motion picture, wherein the motion picture comprises displayed images, the method comprised of displaying an image for an interval, followed by an interval of darkness where no image is displayed, and selectively changing the intervals of image display and the intervals of darkness, such that a camera intended for use in illicit recording of the motion picture captures intervals of darkness, and wherein the camera also captures fewer displayed images than would be captured if the intervals of image display and darkness in the motion picture were the same.

2. The method of claim 1, wherein the images are projected onto a screen by a motion picture film projector.

3. The method of claim 1, wherein the images are projected onto a screen by a digital projector.

4. The method of claim 1, wherein the camera is a video camera or a digital video camera.

5. The method of claim 1, wherein the camera is a digital capture device.

6. The method of claim 1, further comprised of maintaining an average rate of display of the images that substantially corresponds to the intended rate of image display for the motion picture.

7. The method of claim 6, wherein the intended rate of image display for the motion picture is between about 24 frames-per-second and about 72 frames-per-second.

8. The method of claim 6, wherein the intended rate of image display for the motion picture is at least about 24 frames-per-second.

9. The method of claim 4, wherein the camera has an image capture rate of between about 24 frames-per-second and about 60 frames-per-second.

10. The method of claim 4, wherein the camera has an image capture rate of at least about 24 frames-per-second.

11. The method of claim 1, wherein the intervals of image display and the intervals of darkness are changed in a random or asymmetrical manner.

12. The method of claim 1, wherein the intervals of image display and the intervals of darkness are changed in such a way as to cause the intervals to shift forward or backward in a random or asymmetrical manner.

13. The method of claim 1, wherein the intervals of image display and the intervals of darkness are changed in such a way as to cause the intervals to increase or decrease in a random or asymmetrical manner.

14. The method of claim 1, wherein the intervals of darkness are changed so as to occur in an unpredictable pattern.

15. The method of claim 1, wherein the intervals of image display are changed so as to occur in an unpredictable pattern.

16. In a motion picture projector, an apparatus for inhibiting the piracy of a motion picture, wherein the motion picture comprises displayed images, the apparatus comprising a controller that commands the projector to display an image for an interval, followed by an interval of darkness where no image is displayed, and that selectively changes the intervals of image display and the intervals of darkness, such that a camera intended for use in illicit recording of the motion picture captures intervals of darkness, and wherein the camera also captures fewer displayed images than would be captured if the intervals of image display and darkness in the motion picture were the same.

17. The apparatus of claim 16, wherein the motion picture projector comprises a digital projector.

18. The apparatus of claim 16, wherein the motion picture projector comprises a motion picture film projector.

19. The apparatus of claim 16, wherein the motion picture projector comprises a motion picture film projector for projecting film having a series of frames and a plurality of perforations along the edges of the film, the apparatus further comprising:
   a plurality of constant speed sprockets having teeth for engaging the perforations and moving the film through the projector;
   an intermittent advance mechanism for moving the film frame-by-frame past an aperture in the projector;
   a shutter that blocks light from entering the aperture when the frames are being advanced into position relative to the aperture, and that permits light to enter the aperture when a new frame is properly positioned;
   a motive element that actuates the constant speed sprockets, the intermittent advance mechanism and the shutter; and
   wherein the controller is adapted to control the motive element to maintain or change the intervals of image display and the intervals of darkness.

20. The apparatus of claim 16, wherein the controller is adapted to change the intervals of image display and the intervals of darkness in a random or asymmetrical manner.

21. The apparatus of claim 16, wherein the controller is adapted to change the intervals of image display and the intervals of darkness such that the intervals shift forward or backward in a random or asymmetrical manner.

22. The apparatus of claim 16, wherein the controller is adapted to change the intervals of image display and the intervals of darkness such that the intervals increase or in a random or asymmetrical manner.

23. The apparatus of claim 16, wherein the controller is adapted to change the intervals of darkness such that they occur in an unpredictable pattern.

24. The apparatus of claim 16, wherein the controller is adapted to change the intervals of image display such that they occur in an unpredictable pattern.

25. The apparatus of claim 19, wherein the motive element comprises:
   a first motor having a rotational output for rotating the constant speed sprockets;
   a second motor having an output for actuating the intermittent advance mechanism; and
   a third motor having a rotational output for rotating the shutter.

26. The apparatus of claim 19, wherein the shutter comprises a light blocking material.

27. The apparatus of claim 19, wherein the shutter comprises plurality of light blocking materials.

28. The apparatus of claim 19, wherein the shutter comprises a mechanical shutter having serrated, slotted or perforated surfaces.

29. The apparatus of claim 19, wherein the shutter is comprised of a filter having a material that allows for the passage of selected portions of the light spectrum.

30. The apparatus of claim 16, wherein the controller is adapted to maintain an average rate of display of the images that substantially corresponds to the intended rate of image display for the motion picture.

31. The apparatus of claim 30, wherein the intended rate of image display for the motion picture is at least about 24 frames-per-second.

32. The apparatus of claim 19, further comprising a sensor that reads information on the film that identifies filmed sequences that can be subjected to random intervals of image display and other filmed sequences that cannot.

33. The apparatus of claim 19, further comprising a sensor that reads information on the film and causes a signal to be sent to the controller to commence or terminate random intervals of image display.

34. The apparatus of claim 16, wherein the motion picture projector comprises a digital projector, and wherein the controller commands the projector to block the display of selected portions of the images instead of commanding the projector to produce an interval of darkness.

35. In a motion picture projector, an apparatus for inhibiting the piracy of a motion picture, wherein the motion picture comprises displayed images, the apparatus comprising a controller that commands the projector to display an image for an interval, followed by an interval of darkness where no image is displayed, and that changes the intervals of image display relative to the intervals of darkness during projection of the motion picture such that the intervals of image display and the intervals of darkness are not of equal duration.

36. The apparatus of claim 35, wherein the intervals of darkness are shorter than the intervals of image display for a period of time.

37. The apparatus of claim 35, wherein the intervals of darkness are longer than the intervals of image display for a period of time.

38. The apparatus of claim 35, wherein intervals of image display and intervals of darkness that are not of equal duration are followed by intervals of image display and intervals of darkness that are of substantially equal duration.

39. The apparatus of claim 35, wherein the controller changes the durations of the intervals of image display and the durations of the intervals of darkness in a random or asymmetrical manner.

40. The apparatus of claim 35, wherein an interval of darkness having a duration of about 0.0094 seconds is followed by an interval of image display having a duration of about 0.0114 seconds.

41. In a motion picture projector, an apparatus for inhibiting the piracy of a motion picture, wherein the motion picture comprises images that are displayed at a frame rate, the apparatus comprising a controller that commands the projector to display an image for an interval, followed by an interval of darkness where no image is displayed, and that changes the intervals of image display relative to the intervals of darkness during projection of the motion picture such that the intervals of image display and the intervals of darkness are not of equal duration and the frame rate during projection of the motion picture is maintained.

42. The apparatus of claim 41, wherein the frame rate is between about 24 frames-per-second and about 72 frames-per-second.

43. An apparatus for inhibiting the piracy of a motion picture, wherein the motion picture comprises images that are displayed at a frame rate, the apparatus comprising a controller that commands a shutter to permit an interval of image display followed by an interval of darkness where no image is displayed, and that changes the intervals of image display relative to the intervals of darkness during projection of the motion picture such that the intervals of image display and the intervals of darkness are not of equal duration, while maintaining the frame rate during projection of the motion picture.

44. The apparatus of claim 43, wherein the motion picture is displayed by a digital projector.

* * * * *